(12) United States Patent
Wildy

(10) Patent No.: US 6,404,563 B1
(45) Date of Patent: Jun. 11, 2002

(54) PORTABLE ELECTRONIC DEVICE HAVING VARIABLE FOCUS DISPLAY

(75) Inventor: Marc H. Wildy, Phoenix, AZ (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/543,505

(22) Filed: Apr. 6, 2000

(51) Int. Cl.[7] ............................. G02B 3/10; G02B 15/02
(52) U.S. Cl. ....................................... 359/721; 359/672
(58) Field of Search .................... 359/721, 672–675, 359/684; 396/73, 75, 79–82

(56) References Cited

U.S. PATENT DOCUMENTS

| 3,598,031 A | * | 8/1971 | Harvey | 396/73 |
|---|---|---|---|---|
| 3,598,476 A | | 8/1971 | Merigold | 359/684 |
| 5,027,143 A | | 6/1991 | Clark, III et al. | 396/89 |
| 5,107,371 A | | 4/1992 | Shibata et al. | 359/642 |
| 5,189,464 A | | 2/1993 | Farrington et al. | 396/75 |
| 5,771,408 A | | 6/1998 | Mizukawa | 396/65 |

* cited by examiner

Primary Examiner—Jordan M. Schwartz
(74) Attorney, Agent, or Firm—Mark J. Fink

(57) ABSTRACT

A portable electronic device having a variable focus display comprises a housing (512), supporting an image generating apparatus (518, 610, 710, 810), a lens (514, 612, 712, 812), and an optical element (520, 620, 720, 730, 820). The optical element has zero optical power and is located along an optical axis between the image generating apparatus and the lens.

17 Claims, 4 Drawing Sheets

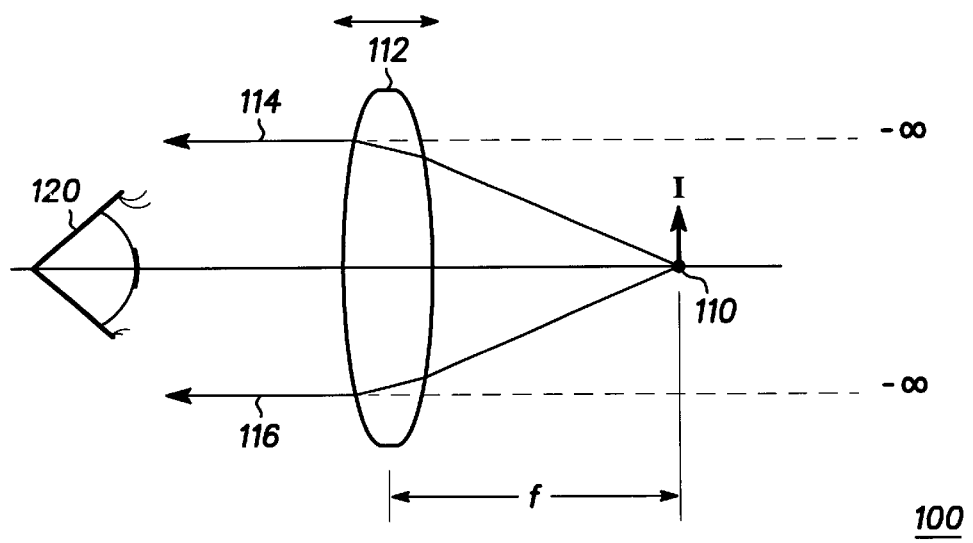
*- PRIOR ART -*     *FIG. 1*
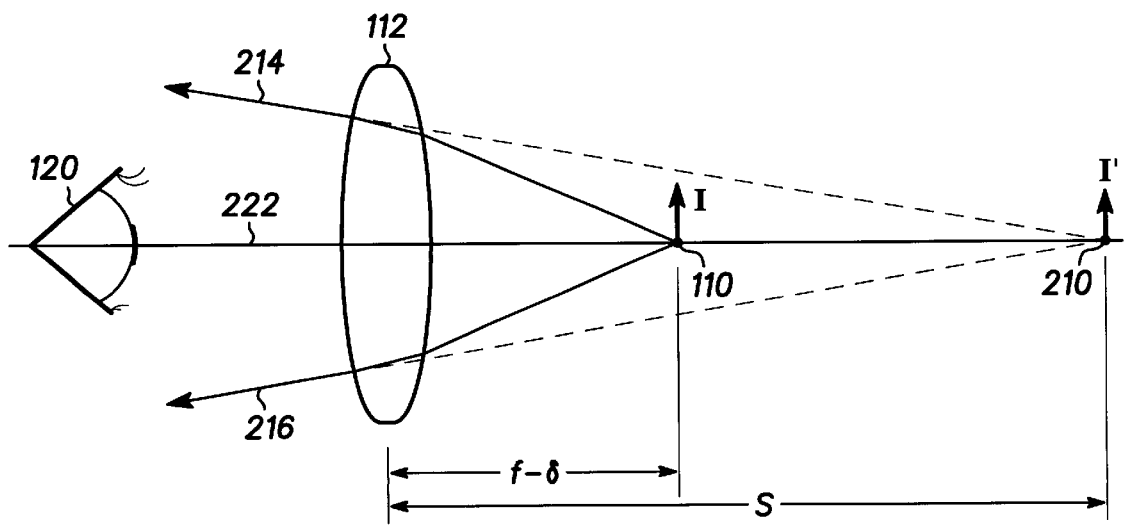
*- PRIOR ART -*     *FIG. 2*

PORTABLE ELECTRONIC DEVICE HAVING VARIABLE FOCUS DISPLAY

FIELD OF THE INVENTION

The present invention is generally directed to optical elements and, more particularly, to apparatus for altering the focus distance of a lens assembly.

BACKGROUND OF THE INVENTION

A major market for optical systems and devices is portable electronic equipment such as cellular telephones, pagers, portable computers and the like. Generally, it is desirable for the information displays used in devices of this type to be compact, with lower power requirements, inexpensive, and yet capable of providing a high quality image. As larger and more complex messages are being sent to remote units and more information is being displayed on portable computers, the ability of the display to present information to the user in a readable format is becoming more challenging. Prior art systems for displaying larger amounts of information typically comprise either a large display that is directly viewed, such as is used in a conventional portable laptop computer, or comprise a small image source with high magnification optics that create a virtual display. The major problem with a direct view system is that it greatly limits the minimum size of the portable electronics on which it is used. This is because the display must be large enough for an operator to read and understand the information being presented. High magnification virtual display units present substantial advantages over direct view systems for displaying large amounts of information using a compact optical package. Virtual image displays, however, generate a virtual image at an apparent distance that is fixed by the optical design and cannot be altered by the user merely shifting his or her viewing position. Since not all users of such devices will have the visual accommodation to focus at the identical image distance, but will have varying degrees of myopia, hyperopia and presbyopia, a virtual image formed at a point in space comfortable to one user may prove to be uncomfortable or even impossible for others to focus on clearly. Accordingly, it has been suggested that a focus mechanism that would permit the apparent location of the virtual image to be moved to various locations between the near point of the eye (25 cm) and infinity would permit individual users to adjust the apparent location of the virtual image for maximum comfort. One approach to providing such a focusing capability would be to provide means for moving the eye piece of a virtual display viewer relative to the image source either by physically moving the eye piece or the image source. This approach, however, presents substantial disadvantages in that very precise positional control must be maintained over the relative positions of the image source and the eye piece, otherwise misalignments can introduce unacceptable image degradations in all or portions of the image. The necessity of precise control over these optical elements therefore increases the complexity, manufacturing tolerances, and cost of such a focus mechanism.

What is needed is a focus mechanism that does not require the eye piece or the image source to be moved, so that the critical alignment between these optical elements can be fixed, thereby enabling a compact inexpensive optical package suitable for a portable electronic device to be realized.

BRIEF DESCRIPTION OF THE DRAWINGS

The invention will be better understood from a reading of the following detailed description, taken in conjunction with the drawings in which like reference numbers are used to identify like elements and in which:

FIG. 1 is a schematic side elevational view of a prior art virtual image display device with the image source at the focus of the lens;

FIG. 2 is a schematic side elevational view of the prior art virtual image display device of FIG. 1 with the eye piece lens moved toward the image source;

DETAILED DESCRIPTION

Figure 3:
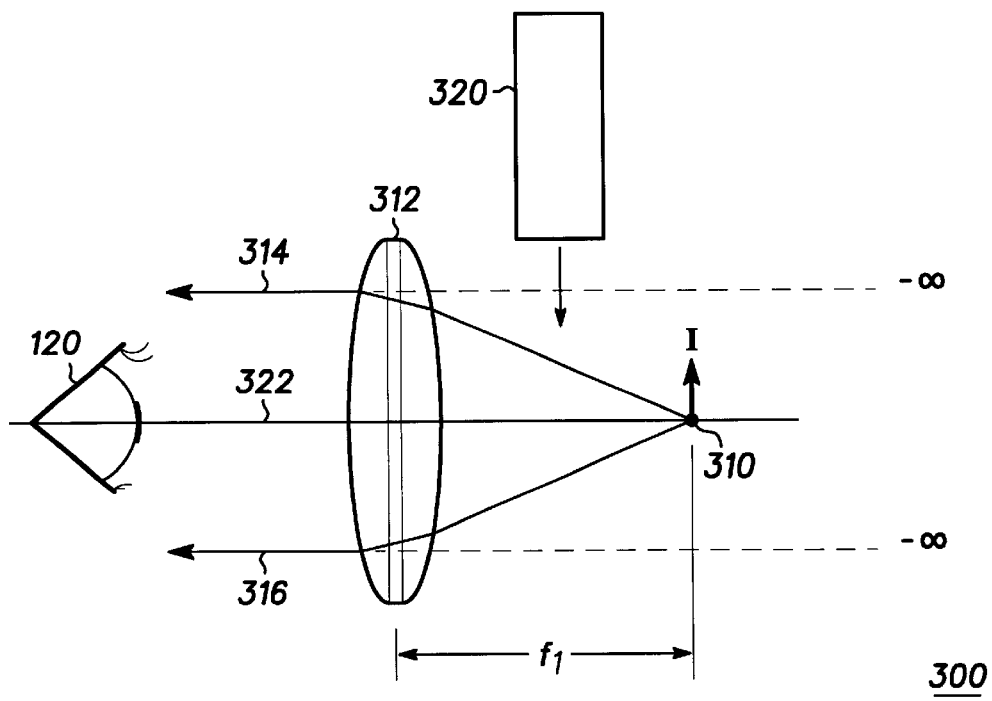
FIG. 3 is a schematic side elevational view of a virtual image display apparatus incorporating features of the present invention.

FIG. 1 is a schematic side elevational view of a prior art variable focus display apparatus 100 comprising an image source 110 and an eye piece lens 112 having a focal length "f" as indicated in FIG. 1. If image source 110 is located the focal length "f", lens 112 converges light rays such as rays 114 and 116 into parallel rays for viewing by a user 120. Since light rays 114 and 116 as viewed by user 120 are parallel, the image of image source 110 appears at infinity to user 120. If, as shown in FIG. 2, lens 112 is moved an amount δ toward image source 110 such that image source 110 is now a distance f−δ from lens 112, light rays 214 and 216 are divergent when viewed by user 120. Divergent light rays 214 and 216 create a virtual image 210, which to user 120 appears at some finite distance "f'" behind lens 112. Although variable focus display apparatus 100 is capable of providing a variable focus, the mechanism holding lens 112 typically requires very precise tolerances. Any misalignment either in terms of translation of lens 112 off the optical axis 222 between the image source 110 and user 120 or in terms of the tilting of lens 112 relative to optical axis 222 can introduce unacceptable image degradations in all or portions of the virtual image of image source 110. Accordingly, viewing apparatus incorporating a movable lens element such as a movable lens 112 may require tolerances that would be undesirably or prohibitively costly for a portable electronic device, such as a cellular telephone, portable computer, smart card reader or the like.

Figure 4:
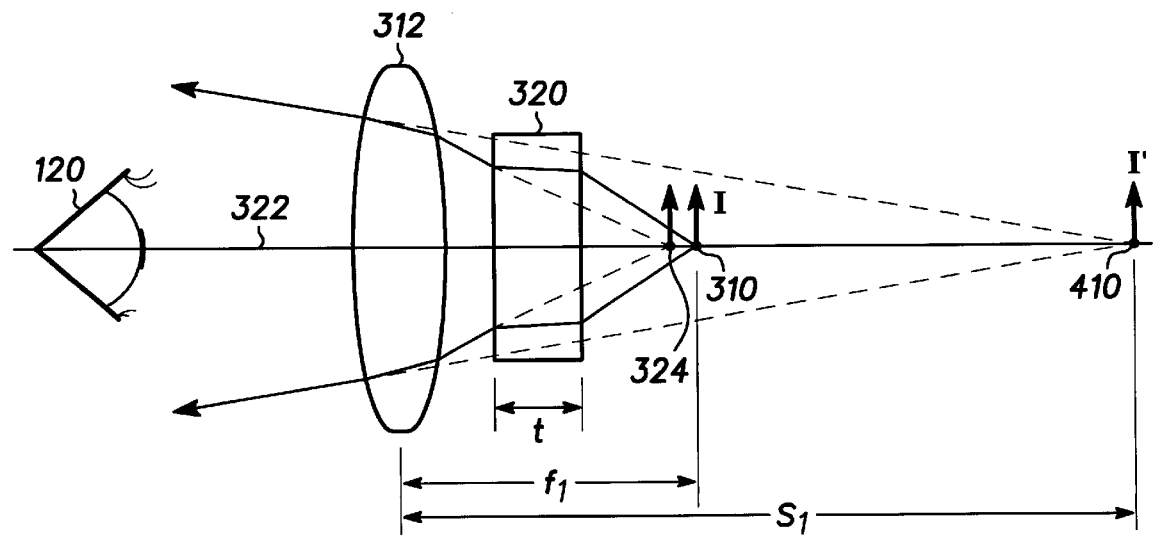
FIG. 4 is a schematic side elevational view of the virtual image display apparatus of FIG. 3 with a removable plane parallel plate in the optical path.

With reference to FIG. 3 and FIG. 4, a variable focus lens assembly 300 incorporating features of the present invention comprises an image source 310 and a lens element or eye piece lens 312 (although eye piece lens 312 is shown as a single lens, as used herein the term "lens" may refer to a lens assembly made up of individual lens elements having, for example, elements correcting for monochromatic and chromatic aberrations). As shown in FIG. 3, eye piece lens 312 has a focal length "$f_1$" as with the prior art virtual image display apparatus, with image source 310 located the focal distance "$f_1$" from eye piece lens 312, light rays such as rays 314 and 316 are converged to become parallel rays as viewed by user 120 and therefore the virtual image of image source 310 appears to the user to be at an infinite distance in a first distance zone or object zone behind eye piece lens 312. Variable focus lens assembly 300 further includes an optical element 320, which is movable into and out of the optical axis or path 322 between image source 310 and eyepiece lens 312. Optical element 320 has an optical power of less than approximately 0.5 inverse meters and preferably has an optical power of zero. One skilled in the art will understand that variations in the manufacturing process for optical element 320 may prevent optical element 320 from having an optical power of exactly zero. As example, optical element 320 can be a plane parallel plate.

As shown in FIG. 4, with optical element 320 in the optical path 322 between image source 310 and eyepiece lens 312, the optical path length between image source 310 and eye piece lens 312 is increased by an amount equal to the difference between the index of refraction "n" of optical element 320 and the index of refraction of air multiplied by the thickness "t" of optical element 320. The change in the optical path length creates a virtual object 324 that is closer to eye piece lens 312 than the actual image source 310. The apparent movement of image source 310 therefore creates a virtual image 410 that appears to the user to be at a finite distance "$s_1$" in a second distance zone or object zone behind eye piece lens 312. Because optical element 320 has substantially zero power, adding it to or removing it from lens assembly 300 in the manner described does not change the optical power of lens assembly 300. By changing the focus (e.g., the apparent distance from the virtual image 410 to the user 120) without changing the optical power of assembly 300, the virtual image will change apparent location, but will not substantially change apparent size. Accordingly, virtual image 410 in the second distance zone is of substantially equal apparent size to a virtual image of image source 310 in the first distance zone.

For example, assuming eye piece lens 312 has a focal length of ten millimeters, if image source 310 is located ten millimeters from eye piece lens 312 as shown in FIG. 3, the virtual image of image source 310 will appear at negative infinity according to the lens maker's formula.

$$\text{Virtual image distance} = \frac{(\text{focal length})(\text{object distance})}{(\text{focal length}) + (\text{object distance})}$$

$$\text{Virtual image distance} = \frac{10 \times (-10)}{10 + (-10)}$$

$$= -100/0 = -\infty$$

If optical element 320 comprises a plane parallel plate having an index of refraction of 1.5 and is 3 millimeters thick, the optical path length is increased by 1 millimeter according to the equation $\Delta z = t (n-1)/n = 3 (1.5-1)/1.5 = 1$ millimeter.

Accordingly, inserting optical element 320 having a 3 millimeter thickness results in the same virtual image shift as moving the source one millimeter closer to the lens, which according to the lens maker's equation, results in a virtual image shifted from negative infinity to negative 90 millimeters.

As is evident from the foregoing, insertion of an additional optical element between a fixed image source 310 and a fixed eye piece lens 312 permits the lens assembly to have a variable focus while allowing image source 310 and eye piece lens 312 to remain stationary and therefore precisely aligned. Moreover, because optical element 320 preferably has no optical power (positive or negative) the optical system is highly insensitive to the positional tolerance of optical element 320 along the optical path, either translational or angular. Accordingly, the drive mechanism for positioning optical element 320 need not require high mechanical tolerances.

Figure 5:
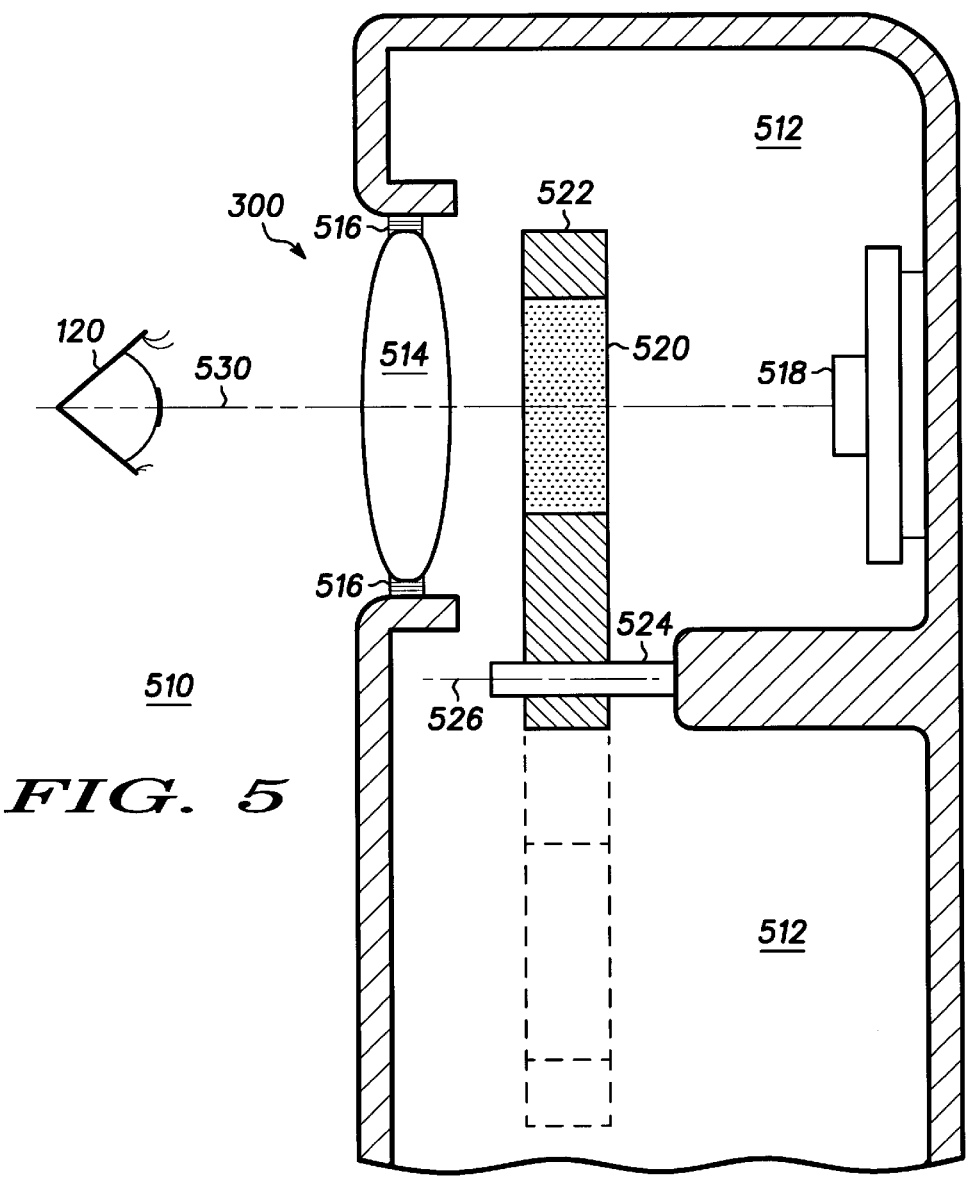
FIG. 5 is a portable electronic device incorporating a variable focus display in accordance with the present invention.

With reference to FIG. 5, a portable electronic device 510 comprises a housing 512 supporting, among other things, a variable focus lens assembly 300. In the embodiment of FIG. 5, an eye piece lens 514 is rigidly secured to housing 512 by a conventional frame 516. An image generating apparatus or image source 518, comprising a liquid crystal display or other display capable of displaying high resolution graphical information is supported by housing 512 either at the focal point of eye piece lens 514 or slightly nearer to eye piece lens 514 than the focal point. Optical element frame 522 is supported by a drive mechanism comprising a pivot 524 for rotation about an axis 526 such that an optical element 520 is movable into the optical path 530 between image source 518 and user 120 as shown in FIG. 5. Similar to optical element 320 in FIGS. 3 and 4, optical element 520 preferably has no optical power. Optical element 520 is also movable out of the optical path 530 between image source 518 and eye piece lens 514 as shown in the dashed lines of FIG. 5. Optical element 520 is preferably a unitary optical element. As is evident from the foregoing, with optical element 520 out of the optical path 530 between image source 518 and user 120, the virtual image of image source 518 to user 120 to be will appear at negative infinity if image source 518 is at the focal point of eye piece lens 514, or at some finite distance behind eye piece lens 514 if image source 518 is nearer than the focal point to eye piece lens 514. In accordance with the invention, movement of optical element 520 into the optical path 530 between image source 518 and eye piece lens 514 will lengthen the optical path thereby causing the virtual image of image source 518 to appear closer to user 120 than when optical element 520 is out of the optical path. In one embodiment of a portable electronic device having a variable focus display, a virtual image distance of five meters with optical element 520 out of optical path 530 and a virtual image distance of 1 meter with optical element 520 in optical path 530 has been found to accommodate a substantial portion of the target population.

Figure 6:
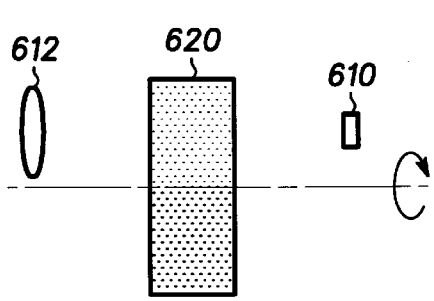
FIG. 6 is a side elevational view of an alternative embodiment of a movable optical element in accordance with the present invention.

Although a two-position variable focus lens assembly may be sufficient for a wide variety of uses, the principles of the present invention are equally applicable to variable focus systems having multiple range, or even continuous focus capability. For example, as shown in FIG. 6, a movable optical element 620 comprising a gradient index of refraction (GRIN) material may be disposed between an image generating apparatus or image source 610 and an eye piece lens 612 to provide a smoothly variable optical path length between image source 610 and eye piece lens 612. Similar to optical element 320 in FIGS. 3 and 4 and optical element 520 in FIG. 5, optical element 620 preferably has no optical power.

Figure 7:
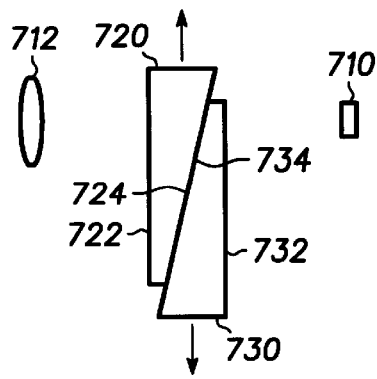
FIG. 7 is a side elevational view of another alternative embodiment of a movable optical element in accordance with the present invention.

Similarly, as shown in FIG. 7, equal angle solid wedges 720 and 730 can be used to provide a variable focus mechanism. Wedges 720 and 730 have non-uniform thicknesses. This mechanism is highly insensitive to positioning errors of tilt, decenter, or axial location for major surfaces 722 and 724 for wedge 720 and for major surfaces 732 and 734 of wedge 730. Wedges 720 and 730 are disposed between an image generating apparatus or image source 710 and an eye piece lens 712. One of wedges 720 and 730 can slide vertically, or both of wedges 720 and 730 can slide in opposite vertical directions, to vary the effective wedge thickness through which the light passes. The combination of wedges 720 and 730 preferably have no optical power.

Figure 8:
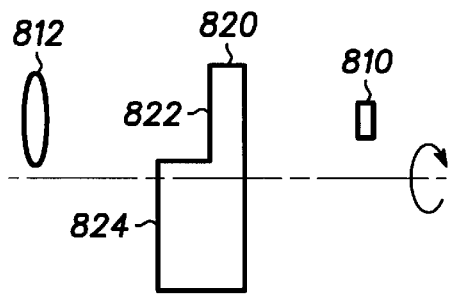
FIG. 8 is a side elevational view of yet another alternative embodiment of a movable optical element in accordance with the present invention.

Additionally, as shown in FIG. 8, a movable optical element 820 comprising two or more discrete steps 822, 824 may be disposed between an image source 810 and an eye piece lens 812 to provide a multistep focus capability. Each of steps 822 and 824 comprise a planar surface. Optical element 820 preferably has no optical power.

Figure 9:
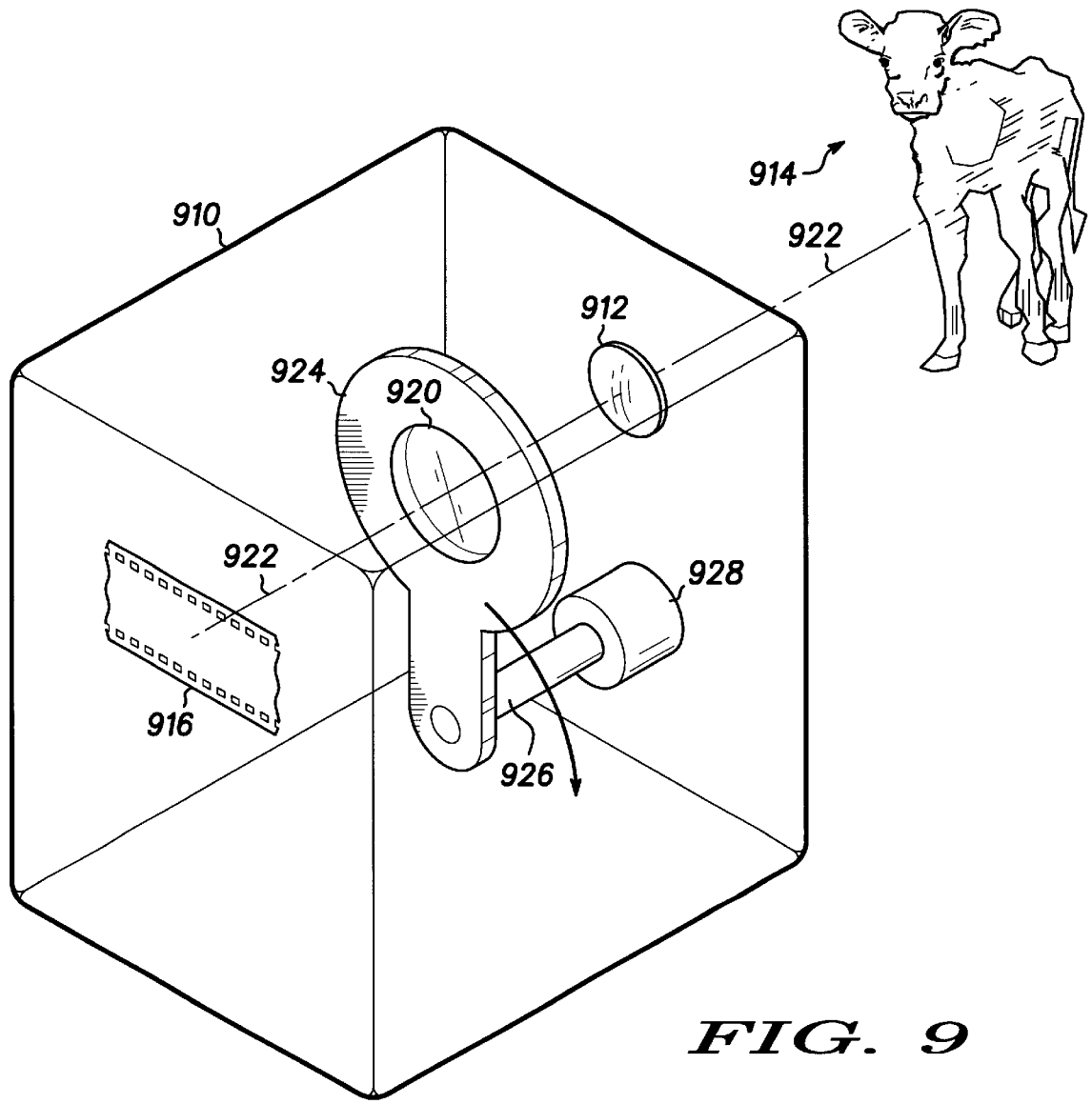
FIG. 9 is a photographic apparatus incorporating a focus mechanism in accordance with the present invention.

Although the foregoing illustrative embodiment contemplates an optical display system, the principle of changing the optical path length between a lens and another optical element by inserting an optical element preferably having zero optical power is equally applicable to imaging systems such as a fixed focused camera. Accordingly, as shown in FIG. 9, a fixed focus photographic apparatus or camera 910 in accordance with the invention comprises a camera lens 912 capable of focusing an image 914 onto a film plane 916 through a zero power optical element 920 when image 914 is at the infinity point relative to lens 912. By removing optical element 920 from the optical path 922 the optical path length between camera lens 912 and film plane 916 is decreased, thereby enabling camera lens 912 to focus onto film plane 916 an object substantially nearer to lens 912 than would otherwise be possible with optical element 920 in place. As shown in FIG. 9, optical element 920 is supported by a lens frame 924 which is rotatable about shaft 926 under the urging of motor 928 or other conventional means.

As is evident from the foregoing, by utilizing an optical element with zero optical power and having a variable thickness in the optical path between a lens and an image source or film plane, an inexpensive variable focus mechanism that does not rely on precision movement of optical elements can be realized.

Although certain preferred embodiments and methods have been disclosed herein, it will be apparent from the foregoing disclosure to those skilled in the art that variations and modifications of the embodiments and methods may be made without departing from the spirit and scope of the invention. For example, other means of varying the thickness of the optical element such as providing multiple stackable optical elements, translating wedges or other optical elements with zero optical power may be employed within the scope of the invention. Accordingly, it is intended that the invention shall be limited only to the extent required by the appended claims and the rules and principles of the applicable law.

What is claimed is:

1. A portable electronic device having a variable focus display comprising:

a housing;

an image generating apparatus supported by said housing;

a first lens element supported by said housing in a fixed position relative to said image generating apparatus, said first lens element defining an optical axis from said image generating apparatus to a user, said first lens element being capable of directing image carrying light rays from said image generating apparatus to form a virtual image of said image generating apparatus capable of being viewed by a user, said virtual image being formed by said first lens element in a first distance zone; and an optical element supported by said housing in a location along said optical axis between said first lens element and said image generating apparatus, said optical element being moveable between a first position in which said virtual image of said image generating apparatus remains within said first distance zone and a second position in which, in combination with said optical element, said first lens element forms a second virtual image of said image generating apparatus within a second distance zone, said second distance zone being nearer to the user than said first distance zone, wherein said optical element has substantially zero optical power.

2. The portable electronic device of claim 1, wherein:

said optical element is of substantially zero optical power such that, when viewed by the user, a virtual image of said image generating apparatus formed in said second distance zone is of substantially equal apparent size to a virtual image of said image generating apparatus formed in said first distance zone.

3. The portable electronic device of claim 2, wherein:

said optical element comprises two major surfaces, each of said two major surfaces comprising a planar surface.

4. The portable electronic device of claim 3, wherein:

said optical element comprises a unitary optical element.

5. The portable electronic device of claim 4, wherein:

said optical element comprises a gradient index material.

6. The portable electronic device of claim 3, wherein:

said optical element comprises a stepped planar surface.

7. The portable electronic device of claim 3, wherein:

said optical element comprises a solid wedge.

8. The portable electronic device of claim 2, wherein:

said optical element comprises an index of refraction and a non-uniform thickness dimension along the optical axis, said first position comprising said optical element positioned such that a relatively thinner thickness dimension is in the optical axis from the image generating apparatus to the user and said second position comprising said optical element positioned such that a relatively thicker thickness dimension is in the optical axis from the image generating apparatus to the user.

9. The portable electronic device of claim 2, further comprising:

a drive mechanism for moving said optical element between said first and second positions.

10. A portable electronic device having a variable focus display comprising:

a housing;

an image generating apparatus supported by said housing;

a first lens element supported by said housing in a fixed position relative to said image generating apparatus, said first lens element defining an optical axis from said image generating apparatus to a user, said first lens element being capable of directing image carrying light rays from said image generating apparatus to form a virtual image of said image generating apparatus capable of being viewed by a user, said virtual image being formed by said first lens element in a first distance zone; and an optical element supported by said housing and moveable between a first position in which said optical element is out of an optical path between said image generating apparatus and said first lens element, and a second position in which said optical element is in the optical path between said image generating apparatus and said first lens element, said optical element in the second position operating in combination with said first lens element to form a virtual image of said image generating apparatus at a second distance zone, said second distance zone being nearer to the user than said first distance zone, wherein said optical element has substantially zero optical power.

11. The portable electronic device of claim 10, wherein:

said optical element is of substantially zero optical power such that, when viewed by the user, a virtual image of said image generating apparatus formed in said second distance zone has a substantially equal apparent size to a virtual image of said image generating apparatus formed in said first distance zone.

12. The portable electronic device of claim 11, wherein:

said optical element comprises a unitary optical element.

13. The portable electronic device of claim 10, further comprising:

a drive mechanism for moving said optical element between said first and second positions.

14. A variable focus lens assembly for use in a photographic apparatus comprising:

a first lens mounted in a fixed position on the photographic apparatus, said first lens capable of directing image-carrying light rays along an optical path from an object located within a first object zone to form an image on a film plane of the photographic apparatus;

an optical element mounted on the photographic apparatus for movement between a first position in which said first lens remains capable of directing image-carrying light rays along the optical path from an object located within the first object zone to form an image on the film plane and a second position in which the first lens, in combination with said optical element, is capable of directing image-carrying light rays along an optical path from an object located within a second object zone to form an image on the film plane, the second object zone being more distant from the photographic apparatus than the first object zone, said optical element having an optical power substantially equal to zero; and a drive mechanism for moving said optical element between said first position and said second position wherein:

said optical element comprises a unitary optical element and a gradient index material.

15. A variable focus lens assembly for use in a photographic apparatus comprising:

a first lens mounted in a fixed position on the photographic apparatus, said first lens capable of directing image-carrying light rays along an optical path from an object located within a first object zone to form an image on a film plane of the photographic apparatus;

an optical element mounted on the photographic apparatus for movement between a first position in which said first lens remains capable of directing image-carrying light rays along the optical path from an object located within the first object zone to form an image on the film plane and a second position in which the first lens, in combination with said optical element, is capable of directing image-carrying light rays along an optical path from an object located within a second object zone to form an image on the film plane, the second object zone being more distant from the photographic apparatus than the first object zone, said optical element having an optical power substantially equal to zero, wherein said optical element comprises a lens element having an index of refraction and a non-uniform thickness dimension along an optical axis, said first position comprising said optical element positioned such that a relatively thinner thickness dimension is in the optical axis from the object to the film plane and said second position comprising said optical element positioned such that a relatively thicker thickness dimension is in the optical axis from the object to the film plane; and a drive mechanism for moving said optical element between said first position and said second position.

16. The variable focus lens assembly of claim 15, wherein:

said optical element comprises a stepped planar surface.

17. The variable focus lens assembly of claim 15, wherein:

said optical element comprises a solid wedge.

* * * * *